G. C. CUMMINGS.
TELEGRAPHY.
APPLICATION FILED AUG. 7, 1918.
1,367,305.
Patented Feb. 1, 1921.
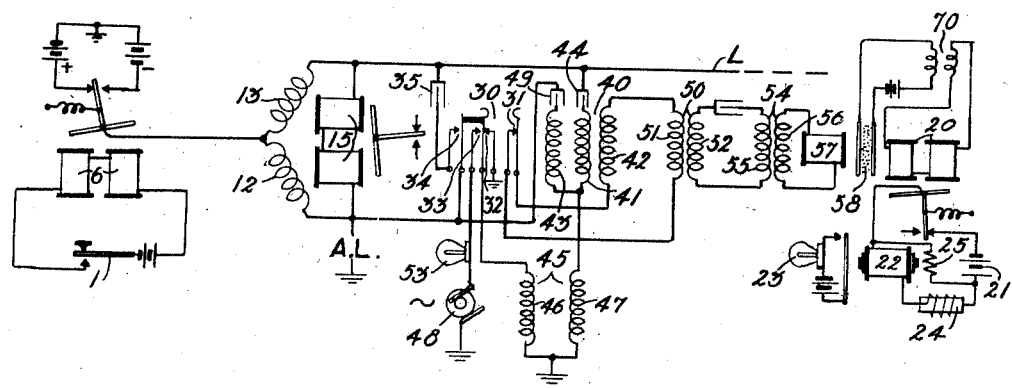
Inventor:
George C. Cummings
by J. E. Roberts Att'y.

UNITED STATES PATENT OFFICE.

GEORGE C. CUMMINGS, OF EAST ORANGE, NEW JERSEY, ASSIGNOR TO WESTERN ELECTRIC COMPANY, INCORPORATED, OF NEW YORK, N. Y., A CORPORATION OF NEW YORK.

TELEGRAPHY.

1,367,305.  Specification of Letters Patent.  Patented Feb. 1, 1921.

Application filed August 7, 1918. Serial No. 248,719.

*To all whom it may concern:*

Be it known that I, GEORGE C. CUMMINGS, a subject of the King of Great Britain, residing at East Orange, in the county of Essex, State of New Jersey, have invented certain new and useful Improvements in Telegraphy, of which the following is a full, clear, concise, and exact description.

This invention relates to telegraph systems and more particularly to systems of duplex telegraphy.

The principal object of this invention is to provide an improved system for the employment of direct currents and alternating currents in signaling over one and the same line conductor.

In accordance with the object of this invention, there is provided means whereby when alternating current signals are being transmitted to a distant station, the balance of the line will be maintained during the transmission of such signals.

In accordance with this invention there is provided in connection with duplex devices, additional equipments for the respective handling of signals controlled through the operation of direct currents and signals controlled through the operation of alternating currents.

This invention is illustrated diagrammatically in the accompanying drawing, in which for the sake of clearness only so much of a telegraphic equipment has been shown as will be necessary to a clear understanding of the features of this system.

In the drawing there is shown an equipment suitable for the simultaneous control of signals operated by direct currents and signals operated by means of alternating currents.

Referring now to the drawing, the transmitting key 1 and pole changer 6 are provided for the transmission of signals controlled by direct currents. The associated main line L may be understood as extending to a distant station (not shown), at which equipment identical to that shown in this figure may be understood as present. Low frequency or direct current signals originating at the assumed distant station may arrive over the line L and through disturbance of balance in the duplex circuits cause the armature of the line relay 15 to operate in controlling local circuits (not shown) which may contain suitable telegraphic receiving devices. During a time low frequency message currents may be under transmission over the line L, signal controlling alternating currents may be superimposed on this line through the operation of a key 30. In its actuated position the key 30 disconnects the secondary winding 42 of a transformer 40 to disable receiving equipment, as will presently be described, and also to switch the winding 46 of a transformer 45 from a ground connection to a source of alternating current 48. Currents from the generator 48 routed through a protective lamp type resistance 53 may act in the primary winding 46 to set up corresponding currents in a secondary winding 47 of this transformer, and such induced currents may flow through the winding 41 of the transformer 40 and a condenser 44, thence by way of the line L to the assumed distant station. A derived circuit extending from a point intermediate the transformer windings 47 and 41 is routed through a third winding 43 of the transformer 40 and a condenser 49, thence by way of the artificial line AL to earth. The circuits of the windings 41 and 43 of the transformer 40, as just traced, should be so proportioned that a balance will be established with respect to the strengths of the alternating currents which may traverse the real line L and the artificial line AL. In order to compensate for any inequalities of balance, however, the contacts 34 of the key 30 establish a condenser 35 in bridge from the real line to the artificial line, thereby forming an alternating current shunt path on the line relay 15 in order to further safeguard this relay from any effects due to unbalance with respect to the alternating currents.

In the reception of alternating currents, let it be assumed that at the distant station such currents are now being applied to the line in a similar manner to that just described. These currents arrive over the line L, traverse the condenser 44, the winding 41 of the transformer 40 and the winding 47 of the transformer 45 to earth. The key 30 being now in its normal position, as shown in the drawing, its contacts 31 complete a loop circuit which includes a secondary winding 42 of the transformer 40 and a primary winding 51 of a transformer 50. Accordingly, currents induced by the winding 41 may circulate in this loop circuit to establish corresponding currents in a second loop circuit formed through a secondary winding 52 of the transformer 50, an associated condenser and the primary winding 55 of a transformer 54. Through a secondary winding 56 of the latter transformer these currents set up effects in a control coil 57 which operates a microphone type current amplifier or repeater 58 which is included with a battery and the primary winding of a transformer 70, the secondary winding of this transformer being connected with the polar relay 20 in a closed loop circuit. The armature of the latter relay controls a local signal circuit identical to the corresponding receiving circuit shown and already described in connection with Fig. 1 of the drawing. The purpose of the transformers 50 and 54 is to serve as a suitable network or filtering arrangement for tuning out currents other than the alternating currents which are intended to be manifested through the relay 20 in controlling the operation of the signal 23. The microphone 58 serves to amplify these filtered or selected alternate currents in order to permit relatively feeble currents to be employed through the line conductor circuits and to insure that such currents may have sufficient strength to properly operate the relay 20. At the transformer 40, in addition to the currents induced in the winding 42, current changes in the winding 41 in the form of incoming signals also set up corresponding current changes in the third winding 43 of this transformer. The latter currents in completing circuit through the artificial line AL to earth serve to establish a neutralizing or balancing effect of the duplex circuits with respect to the direct current or low frequency line relay 15 connected intermediate the real and the artificial line. Therefore, alternating currents of relatively attenuated volume and high frequency may be employed in signaling over the line L during the time low frequency or direct currents may be employed as by means of the key 1 in transmitting other signals over the same line.

It will also be understood that the line conductors of either of the arrangements shown and described in this system may be employed as conductors in forming line pairs suitable for the carrying of telephonic communications, as well understood in simultaneous telegraph and telephone working.

What is claimed is:

1. In a signaling system, a line conductor, a duplex set for transmitting and receiving direct current signals over said line, a second duplex set associated with said line, a source of alternating current, a transmitting key for connecting with said second duplex set said source of alternating current, and a shunt containing an impedance connected in bridge of the direct current receiving circuit by the actuation of said key for maintaining a condition of balance on said line.

2. In a signaling system, a line conductor, a duplex set for transmitting and receiving direct current signals over said line, a second duplex set for providing an additional telegraph channel, a source of alternating current, means for connecting said source of current to said second duplex set, and means connected in bridge of the direct current receiving circuit by the actuation of said means for maintaining a condition of balance on said line.

3. A signaling system comprising a line conductor, a duplex set connected with said line, transmitting and receiving means associated with said duplex set for the transmission and reception of direct current signals over said line, a pair of ratio arms in addition to those of said duplex set for providing an additional channel for alternating current signals, and transmitting means for connecting in bridge of the direct current receiving means a shunt containing a condenser for rendering the same opaque to direct current signals and conducting to alternating current signals upon the transmission of alternating current signals over said line.

4. A signaling system comprising a line conductor, a duplex set connected with said line, transmitting and receiving means associated with said duplex set for the transmission and reception of direct current signals over said line, a pair of ratio arms in addition to those of said duplex set for providing an additional channel for alternating current signals, a condenser normally ineffective, and a key operative for the transmission of alternating current signals and for connecting said condenser in bridge of said direct current receiving means for maintaining a condition of balance on said line.

In witness whereof, I hereunto subscribe my name this 31st day of July, A. D., 1918.

GEORGE C. CUMMINGS.